(12) United States Patent
Cortavitarte Pérez

(10) Patent No.: US 12,654,199 B2
(45) Date of Patent: Jun. 16, 2026

(54) VEHICLE PLASTERING MOULDING TAPE AND METHOD FOR VEHICLE PLASTERING USING SAID MOULDING TAPE

(71) Applicant: Daniel Cortavitarte Pérez, Avilés (ES)

(72) Inventor: Daniel Cortavitarte Pérez, Avilés (ES)

(*) Notice: Subject to any disclaimer, the term of this patent is extended or adjusted under 35 U.S.C. 154(b) by 0 days.

(21) Appl. No.: 18/864,368

(22) PCT Filed: May 9, 2023

(86) PCT No.: PCT/ES2023/070295
§ 371 (c)(1),
(2) Date: Nov. 8, 2024

(87) PCT Pub. No.: WO2023/218108
PCT Pub. Date: Nov. 16, 2023

(65) Prior Publication Data
US 2025/0303440 A1 Oct. 2, 2025

(30) Foreign Application Priority Data
May 10, 2022 (ES) ............................ ES202230413U

(51) Int. Cl.
B05D 3/12 (2006.01)
B05D 5/00 (2006.01)
C09J 7/21 (2018.01)

(52) U.S. Cl.
CPC .............. B05D 3/12 (2013.01); B05D 5/005 (2013.01); C09J 7/21 (2018.01); C09J 2203/354 (2020.08); C09J 2301/16 (2020.08); C09J 2301/50 (2020.08)

(58) Field of Classification Search
CPC ................ C09J 7/20; C09J 7/201; C09J 7/21
See application file for complete search history.

(56) References Cited

U.S. PATENT DOCUMENTS

| | | |
|---|---|---|
| 5,037,686 A | 8/1991 | Conboy |
| 2008/0085366 A1 | 4/2008 | Lian et al. |
| 2021/0299993 A1* | 9/2021 | Cara .......................... C09J 7/29 |
| 2021/0355692 A1* | 11/2021 | Jöneman ................ E04F 13/06 |

FOREIGN PATENT DOCUMENTS

| | | | | |
|---|---|---|---|---|
| EP | 2088180 A1 * | 8/2009 | ............... | C09J 7/22 |
| ES | 2802881 A1 | 1/2021 | | |
| WO | 2021009391 A2 | 1/2021 | | |

OTHER PUBLICATIONS

Written Opinion of the Int'l Searching Authority for PCT/ES2023/070295, Nov. 16, 2023, 5 pages. (Year: 2023).*
WO 2021-009391 Machine Translation (Year: 2021).*
Ingemacanica, "Tablas de Propiedades de Materiales", Aug. 10, 2017, https://web.archive.org/web/20170810190052/ https://ingemecanica.com/tutoriales/materiales.html.

* cited by examiner

*Primary Examiner* — Zachary M Davis
(74) *Attorney, Agent, or Firm* — The Webb Law Firm

(57) ABSTRACT

The present invention relates to a vehicle plastering moulding tape including at least one longitudinal section, made of a material with a Young's modulus of between 0.5 and 4 GPa, measured according to the international standard ASTM E111-17.

12 Claims, 4 Drawing Sheets

1
2c
2a
2b 1
2a
2b
4a
5a

VEHICLE PLASTERING MOULDING TAPE AND METHOD FOR VEHICLE PLASTERING USING SAID MOULDING TAPE

CROSS-REFERENCE TO RELATED APPLICATIONS

This application is the United States national phase of International Application No. PCT/ES2023/070295 filed May 9, 2023, and claims priority to Spanish Patent Application No. P202230413 filed May 10, 2022, the disclosures of which are hereby incorporated by reference in their entireties.

BACKGROUND OF THE INVENTION

Field of the Invention

The present disclosure belongs to the technical field of vehicle repair.

More particularly, this disclosure relates to a plastering moulding tape, intended to facilitate the tasks of filling the irregularities present in a surface of a vehicle to be able to subsequently paint on said surface.

Therefore, the tape object of the present disclosure is especially useful in repair operations of vehicle bodywork such as, for example, mopeds, motorcycles, cars, vans, trucks, buses, farm vehicles, trailers, boats and aircraft.

Description of Related Art

Various vehicle painting techniques are currently known, such as, for example, roller paint application, brush application, as well as spray painting.

Regardless of the painting technique that is used, before painting a surface of the vehicle, for example a portion of its bodywork, it is necessary to previously prepare said surface to be painted, levelling and filling the irregularities that are present in the same.

This action, which is also known as plastering, is normally done manually. To carry it out, spatulas, trowels, or similar tools are usually used, intended—in the first place—to mould a filling putty or plaster (which is sometimes mixed with hardening catalysts) and subsequently to fill the surface with said putty to repair existing defects in same (such as cracks, bumps, scratches and the like).

Once the putty is dry, the surface is usually sanded so that it is as smooth as possible.

Frequently, the surfaces to be plastered are provided with outer or inner corners (concave or convex), which must be filled freehand with the putty. This implies that being able to obtain a good definition of the putty line at the corners only depends on the expertise and good pulse of the operators responsible for carrying out these tasks, which is why the expected results are not always obtained.

This difficulty makes the plastering of the corners especially laborious since, to obtain an optimal definition, reworking the same corner several times is usually required, both above and below same. In addition, it is common for some putties to dry on the spatulas before finishing the job, especially catalysed putties, due to the extra time involved in the plastering of the corners.

Moreover, the fact of having to plaster freehand means that on many occasions more putty than required is used while at other times, too little is used.

In both cases the repair is defective. Thus, in the first of them, due to the loss of material used in excess, which must be subsequently sanded, increasing the final time in the repair, as well as the unnecessary expense of sandpaper for said repair. In the second case, since the amount of putty applied is small, the repair time is also lengthened, since more putty must be prepared and the areas of the corner that were correctly plastered the first time must be reworked again.

Frequently, if the corner is in poor condition, a smaller amount of putty is used and said corner is plastered twice, as it is easier to define same and use a smaller amount of product to achieve a better definition before subsequent sanding thereof.

In addition, to define the corners more accurately, sometimes the use of masking tapes or other similar ones is required. However, in order to apply this method, a portion of the plastered corner must be allowed to dry and then plaster the other portion. This has the drawback that it takes much longer than in the traditional system of freehand plastering.

To help define the corner, previously hardened prefabricated putty strips can also be used, as disclosed in Spanish patent application ES2802881A1, owned by this same applicant.

Said hardened putty strips are glued to the soft putty above and below the corner so that subsequently, and once dry, the strips are sanded together with the applied filler putty. This method is quite effective in defining the corner but requires great accuracy when gluing the strips to the putty, since air pockets are produced inside same that must be removed very well by exerting pressure on same in a very technical manner. In addition, if the putty strips are not thoroughly sanded so that these pockets disappear, there is a risk that air bubbles will end up appearing in the paint in the future. This thorough sanding operation of the hardened putty strips can result in excessive sanding of the corner, which translates into a deformation of the same, making it necessary to subsequently re-caulk the affected area.

SUMMARY OF THE INVENTION

The present disclosure is intended to address all of the limitations, drawbacks and inconveniences associated with the prior art corner-plastering techniques, described above.

For this, a first object of the disclosure relates to a vehicle plastering moulding tape comprising, at least, a longitudinal section, made of a material with a Young's modulus of between 0.5 and 4 GPa, measured according to the international standard ASTM E111-17.

The vehicle plastering moulding tape according to the present disclosure makes it possible to correctly define the corners (or in other words to mould) during the plastering operation in a quick and efficient manner, using the right amount of putty required for said operation. In addition, it allows the corners to be plastered in a very defined manner, which reduces the subsequent sanding time and the consumption of materials required to sand said corners, increasing both the quality and the final profitability of said plastering task. In view of this last feature, the tape of the disclosure can also be considered as a sanding edging tape.

In addition, the fact that the longitudinal sections of the moulding tapes are made of a material with the claimed Young's modulus properties makes them semi-rigid and sufficiently stable so that they do not bend transversely and are, in turn, flexible enough in the longitudinal direction to be able to pull them and be able to detach them from the dry putty, according to the method described later.

Likewise, at least one face of the longitudinal sections (which is intended to be in contact with the putty) preferably has non-stick properties, such that said longitudinal section can be detached from the plastering putty once it has hardened, without dragging a portion thereof when pulling, which allows leaving the putty smooth and fine, ready for subsequent sanding.

In an embodiment of the invention, the vehicle plastering moulding tape is provided with a longitudinal pre-cut that divides said tape into two straight longitudinal sections.

This configuration facilitates the application of said moulding tape to a straight corner, since it allows each of the longitudinal sections of the vehicle plastering moulding tape to be folded around the pre-cut and placed on one of the faces of the corner, serving as a mould and making the putty adopt the same shape as said longitudinal section. In this way, the corner is correctly defined.

Preferably, the vehicle plastering moulding tape is provided with a longitudinal pre-cut on each of its faces, said longitudinal pre-cuts being aligned with each other and configured so that they divide said moulding tape on each of its faces, into two straight longitudinal sections.

The moulding tape according to the embodiment described in the previous paragraph has the advantage that the longitudinal sections can be bent around the pre-cut provided on either of its two faces, which allows said moulding tape to be applied both on convex corners (i.e., protruding outwards), and concave corners (folded inwards).

In addition, the vehicle plastering moulding tape is preferably provided with, on at least one of its faces, a silicone paper intended to protect said tape.

In a preferred embodiment of the disclosure, the vehicle plastering moulding tape is provided with:

a longitudinal pre-cut that divides said moulding tape into two straight longitudinal sections, and two silicone papers, each of said silicone papers being arranged on one of the faces of the moulding tape, wherein, furthermore, one of said silicone papers is provided with a longitudinal cut which arrangement coincides with that of the longitudinal pre-cut of the moulding tape, while the other silicone paper covers the corresponding face of the moulding tape without interruptions (i.e., lacks cuts or other discontinuities).

In the embodiment shown in the previous paragraph, the longitudinal sections can be folded around the face of the moulding tape on which continuous silicone paper is arranged (i.e., the one without cuts or discontinuities).

In a particular embodiment of the present disclosure, the vehicle plastering moulding tape comprises at least one longitudinal section that is curved describing a constant radius of curvature. This variant of the disclosure is mainly intended to help in the plastering of curved corners and is useful, for example, in the plastering of the front and rear wings of motor vehicles, since due to the particular shape of the longitudinal sections, these can be correctly suited to the wheel contours of said front and rear wings.

These repair tasks are especially complex because they require to make the arch of the vertical plane of the wing coincide with the arch of the inclined plane of same.

For this reason, the present disclosure expressly contemplates the possibility of equipping the longitudinal sections of the vehicle plastering moulding tapes with different radii of curvature, so that they can be used to plaster all the ranges of corners that are usually provided in automobile wings. As a general rule, if the angle of the inclined plane is large, the radius of the longitudinal section intended to be placed at the upper portion will have to be larger and vice versa.

In another embodiment of the present disclosure, the vehicle plastering moulding tape comprises two longitudinal pre-cuts that divide said tape into three straight longitudinal sections.

The vehicle plastering moulding tape described in the previous paragraph has the advantage that it can be placed on a surface of a vehicle provided with two different corners adjacent to one another (as shown schematically in FIG. 3B). In addition, it could also be used with a surface provided with a single corner. To do this, it would suffice to leave one of the pre-cuts unused and fold the longitudinal sections of the second pre-cut to place them on the only existing corner, making the putty adopt the same shape as said longitudinal sections.

A variant of the embodiment described in the previous paragraphs consists of a vehicle plastering moulding tape, which is provided with:

two longitudinal pre-cuts that divide said moulding tape into three straight longitudinal sections, and two silicone papers, each of said silicone papers being arranged on one of the faces of the moulding tape, wherein, furthermore, one of said silicone papers is provided with a longitudinal cut which arrangement coincides with that of the first longitudinal pre-cut of the moulding tape, while the other silicone paper is provided with a longitudinal cut which arrangement coincides with that of the second longitudinal pre-cut of the moulding tape.

The moulding tape described in the previous paragraph could be placed on a surface of a vehicle provided with two different corners adjacent to one another, one of said corners being convex and the other concave.

In an alternative embodiment of the disclosure, the vehicle plastering moulding tape comprises:

at least two longitudinal sections arranged parallel and adjacent to each other; and at least one adhesive strip, arranged between two adjacent longitudinal sections, such that it connects said longitudinal sections to one another, the adhesive strip further defining an axis of rotation of said longitudinal sections.

The longitudinal sections can preferably be made of polyester putty coated with a flexibiliser additive. The use of this combination of materials allows vehicle plastering moulding tapes to be used in the repair of corners by moulding, since their longitudinal sections will be able to withstand the high working temperatures without deforming, which could otherwise compromise the accuracy of the plastering.

In addition, the use of these materials allows the application of heat to speed up the drying process of the putty, without risking the elongated strips to deform, which would likely occur if the elongated strips were made of plastic.

Likewise, the use of a flexibiliser additive gives the longitudinal sections enough flexibility so that the plastering moulding tape can be wound on a mandrel, which facilitates its storage, distribution and subsequent sale in the market.

Preferably, the longitudinal sections have a thickness of between 0.2 and 0.4 tenths of a millimetre, more preferably 0.3 tenths of a millimetre. Furthermore, the longitudinal sections preferably have a width of approximately 25 mm.

A second object of the disclosure relates to a method for plastering a surface of a vehicle provided with at least one corner, with a vehicle plastering moulding tape according to the first object of the disclosure, which comprises the following steps:

filling the faces of the corner with putty to repair the existing defects in same;

placing the vehicle plastering moulding tape on the putty before it dries, pressing at least one longitudinal section of the plastering moulding tape against one of the faces of the corner, so that the putty adopts the same shape as said longitudinal section;

reworking the putty that protrudes from the vehicle plastering moulding tape and allowing it to stick to the longitudinal section;

once the putty is dry, removing the vehicle plastering moulding tape, pulling on the elongated section; and sanding the faces of the corner.

As seen above, if the corner is straight, the use of a vehicle plastering moulding tape provided with at least one longitudinal pre-cut that divides said tape into at least two straight longitudinal sections is preferred. Thus, each of said longitudinal sections of the moulding tape can be folded around the pre-cut and placed on one of the faces of the corner, serving as a mould and ensuring that the corner is correctly defined. Otherwise, the plastering method would be identical to that described above.

Moreover, if the corner is curved, the use of a vehicle plastering moulding tape provided with at least one curved longitudinal section, the radius of curvature of which coincides with that of the corner, is preferred. In this case, the curved longitudinal section can be placed on the lower face of the corner. Thus, the curved longitudinal section serves as a mould for the lower face and as a guide to correctly define the corner during plastering. Otherwise, the plastering method would be identical to that described above.

Alternatively, to fill a curved corner, a moulding tape with two curved longitudinal sections can be used, one curved longitudinal section being placed on the lower face of the corner and another on the upper face. Depending on the characteristics of the corner to be plastered, said curved longitudinal sections could have equal or different radii of curvature.

BRIEF DESCRIPTION OF THE DRAWINGS

What follows is a set of drawings with very brief descriptions to help the disclosure be further understood, drawings that are expressly related to an embodiment of said disclosure and provide non-limiting examples of the same.

NUMERICAL REFERENCES OF THE DRAWINGS (1) Vehicle plastering moulding tape;
(2a, 2b, 2c) Longitudinal section;
(3a, 3b) Longitudinal pre-cuts;
(4a) Adhesive strip;
(5a) Axis of rotation;
(6) Plastering putty.

DESCRIPTION OF THE INVENTION

A description of various preferred cases of uses for the disclosure is made below.

Throughout the present description, as well as in the attached figures, the elements with equal or similar functions will be designated with the same numerical references.

Figure 1:
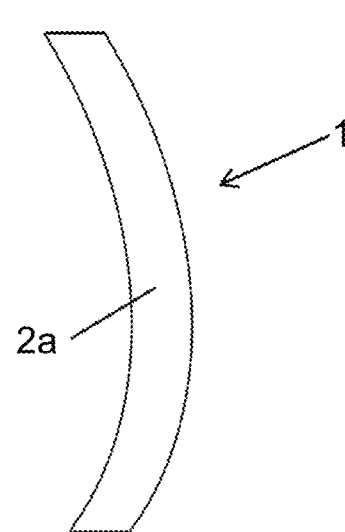
FIG. 1 is a front view of a first embodiment of a vehicle plastering moulding tape according to the present disclosure.

FIG. 1 shows a first embodiment of a vehicle plastering moulding tape (1) according to the present disclosure comprising a single curved longitudinal section (2a).

Figure 2:
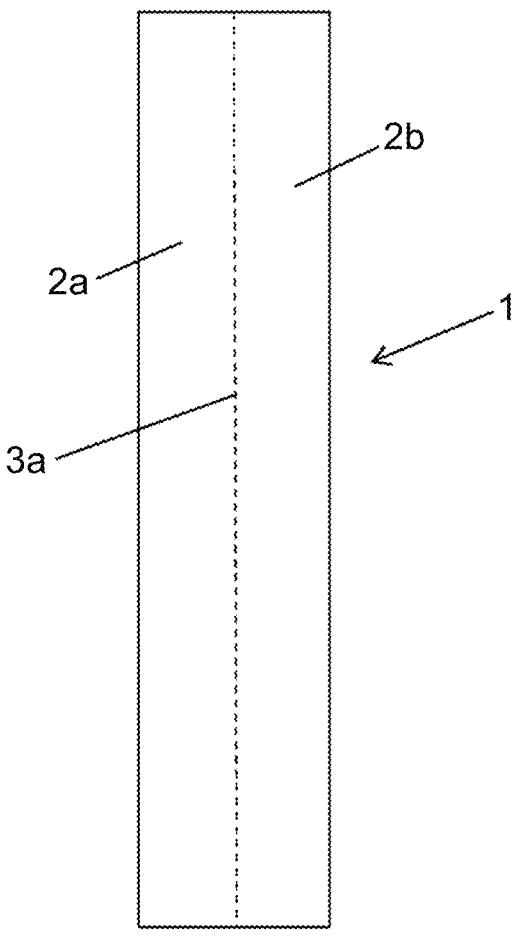
FIG. 2 is a front view of a second embodiment of a vehicle plastering moulding tape according to the present disclosure.

FIG. 2 shows a second embodiment of a vehicle plastering moulding tape (1) according to the present disclosure that is provided with a longitudinal pre-cut (3a), arranged so that they divide the tape (1) into two straight longitudinal sections (2a, 2b) having approximately the same width.

Figure 3A:
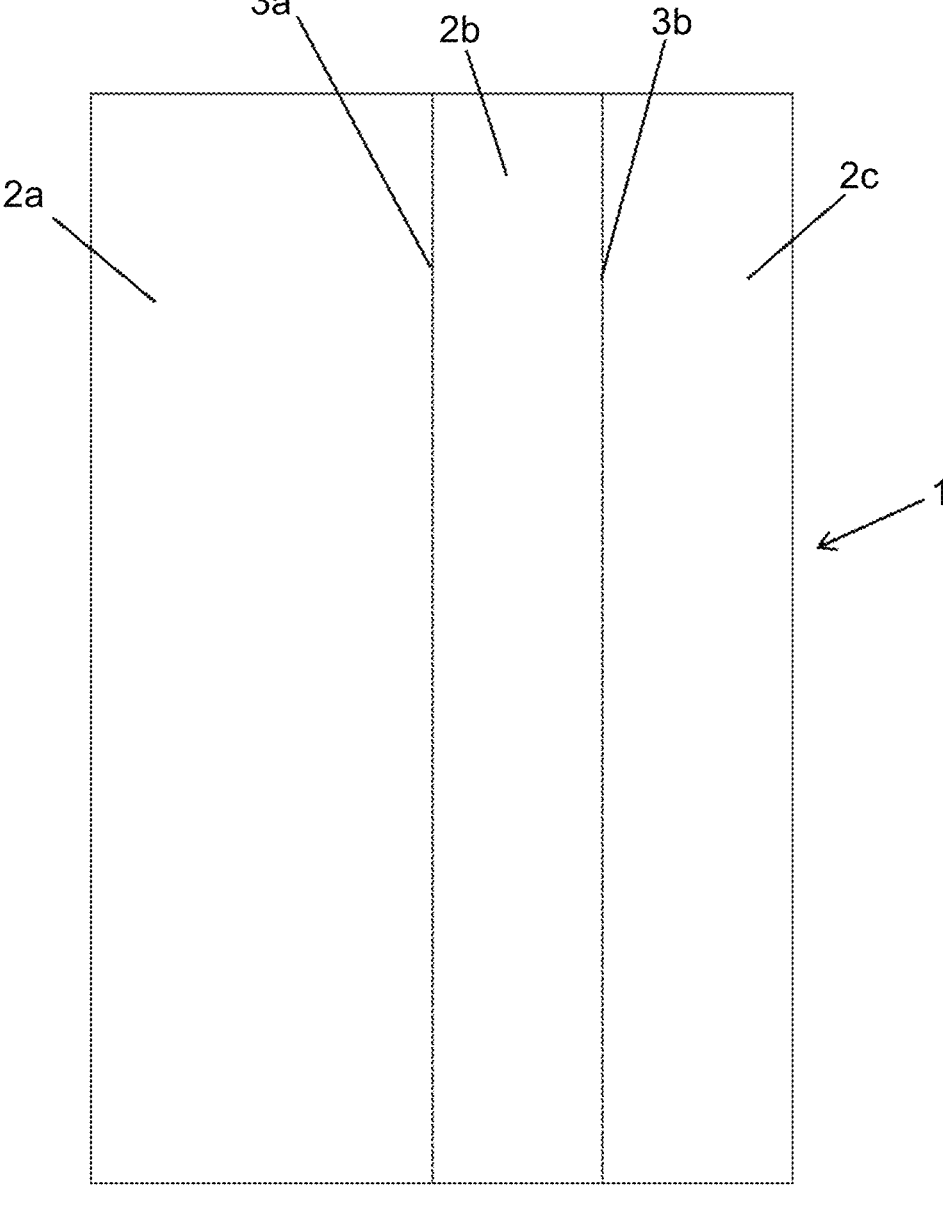
FIGS. 3A and 3B show a third embodiment of a vehicle plastering moulding tape according to the present disclosure, FIG. 3A being a front view of the same and FIG. 3B being a plan view of the latter, once said tape has been placed on a surface to be plastered, provided with two different corners.
Figure 3B:
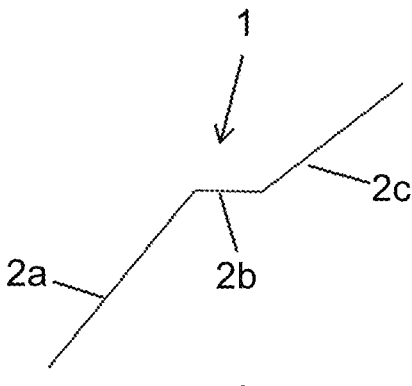

FIGS. 3A and 3B show a third embodiment of the vehicle plastering moulding tape (1) of the disclosure. In this particular case, the vehicle plastering moulding tape (1) comprises two longitudinal pre-cuts (3a, 3b) that divide the tape into three straight longitudinal sections (2a, 2b, 2c).

In the embodiment shown by FIGS. 3a and 3B, the pre-cut (3a) is provided such that it approximately divides the plastering moulding tape (1) into two portions of the same width, while the pre-cut (3b) is arranged at a quarter of the total width of the strip (1).

FIG. 3B schematically shows one of the possible shapes that the longitudinal sections (2a), (2b) and (2c) can adopt to adjust to the contour of a surface to be plastered on a vehicle, provided with two different corners adjacent to one another.

In the particular case shown in FIG. 3B, the straight longitudinal sections (2a) and (2b) are arranged so as to define a concave corner, while the straight longitudinal sections (2b) and (2c) are arranged so as to define a convex corner.

Figure 4A:
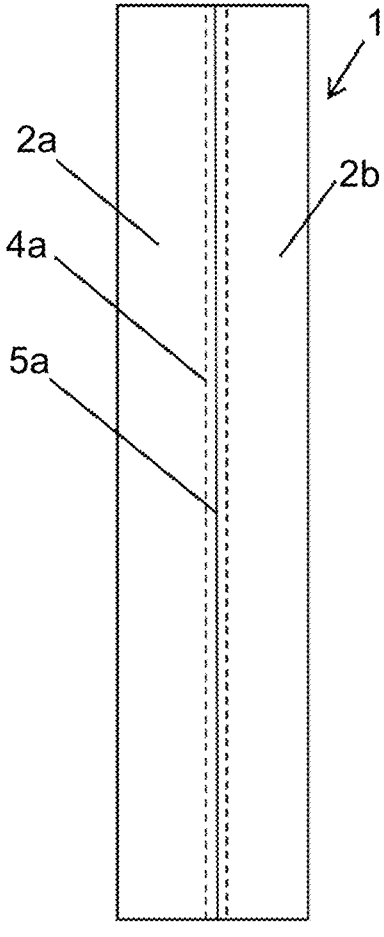
FIG. 4A is a front view of a fourth embodiment of a vehicle plastering moulding tape according to the present disclosure.

FIG. 4A shows a fourth embodiment of a vehicle plastering tape (1) according to the present disclosure comprising, in this particular case, two longitudinal sections (2a, 2b) that are straight and adjacent to one another.

The longitudinal sections (2a, 2b) are connected to one another by means of an adhesive strip (4a).

As shown in FIG. 4A, the longitudinal sections (2a, 2b) are initially arranged on the same plane. However, the axis (5a) of rotation allows the longitudinal section (2a) to rotate angularly with respect to the longitudinal section (2b) and vice versa, i.e., the longitudinal section (2b) rotates angularly with respect to the longitudinal section (2a). This allows the longitudinal sections (2a) and (2b) to be placed in the same direction as the two faces of an corner of a vehicle to be plastered.

Figure 4B:
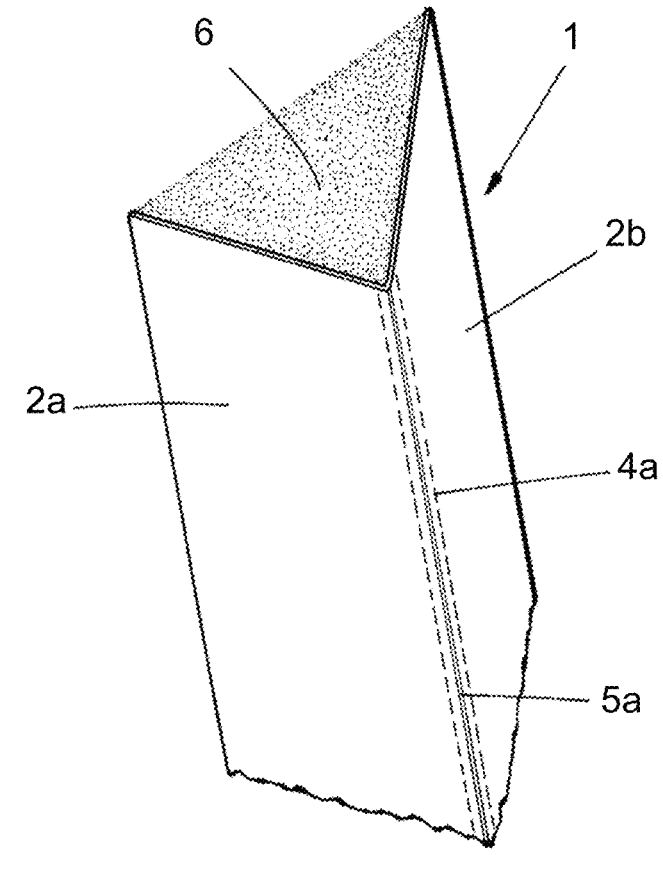
FIG. 4B is a perspective view of the tape of FIG. 4A, once said tape has been placed on a surface to be plastered on a vehicle, said surface being provided with an corner.

In fact, FIG. 4B illustrates the manner in which the longitudinal sections (2a, 2b) of the tape of FIG. 4A are arranged on the corner faces of a surface to be plastered, once said corner has been filled with putty (6).

Figure 5:
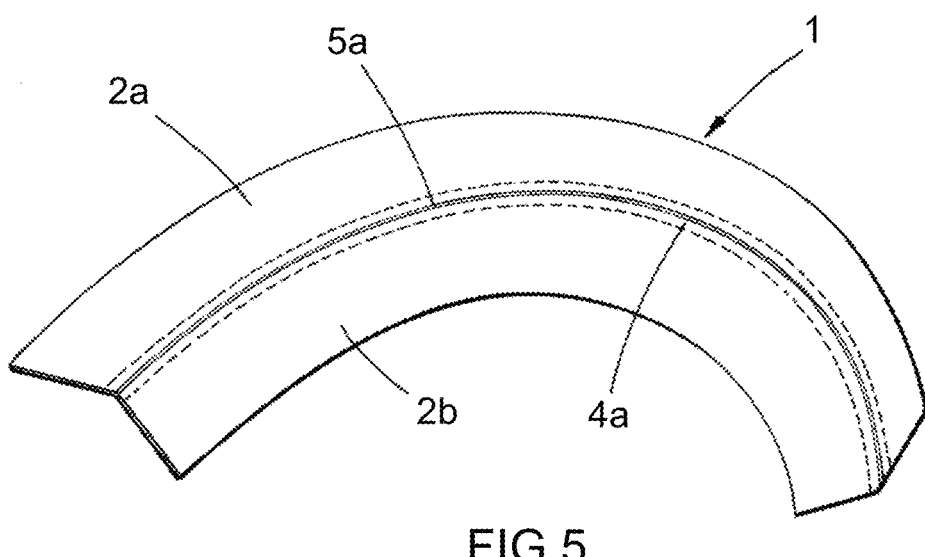
FIG. 5 is a front view of a fifth embodiment of a vehicle plastering moulding tape according to the present disclosure.

Finally, FIG. 5 shows a fifth and final embodiment of a vehicle plastering tape (1), similar to the one illustrated in FIGS. 4B and 4B, but provided with two curved longitudinal sections (2a, 2b).

On this occasion, the longitudinal sections (2a, 2b) are also joined together by means of an adhesive strip (4a) and have an axis (5a) of rotation that allows the longitudinal section (2a) to rotate angularly with respect to the longitudinal section (2b) and vice versa.

The invention should not be limited to the particular embodiment described herein. People skilled in the art may develop other embodiments in light of the description provided herein. Accordingly, the scope of the invention is defined by the following claims.

The invention claimed is:

1. A vehicle plastering moulding tape comprising at least one longitudinal section made of a material with a Young's modulus of between 0.5 and 3.5 GPa measured according to the international standard ASTM E111-17, wherein a longitudinal pre-cut is provided that divides the tape into two straight longitudinal sections, and wherein the longitudinal sections are sheets made of polyester putty coated with a flexibilizer additive.

2. The vehicle plastering moulding tape according to claim 1, wherein on each of the faces thereof the tape is provided with a longitudinal pre-cut, the longitudinal pre-cuts being aligned with one another and configured so that they divide the moulding tape on each of its faces, into two straight longitudinal sections.

3. The vehicle plastering moulding tape according to claim 1, wherein at least one of the faces of the tape is provided with silicone paper.

4. The vehicle plastering moulding tape according to claim 1, the moulding tape comprising:

two silicone papers, each of the silicone papers being arranged on one of the faces of the moulding tape, wherein one of the silicone papers is provided with a longitudinal cut which arrangement coincides with that of the longitudinal pre-cut of the moulding tape, while the other silicone paper covers the corresponding face of the moulding tape without interruptions.

5. The vehicle plastering moulding tape according to claim 1, wherein two pre-cuts are provided that divide the tape into three straight longitudinal sections.

6. The vehicle plastering moulding tape according to claim 1, which comprises:

two pre-cuts that divide the moulding tape into three straight longitudinal sections; and two silicone papers, each of the silicone papers being arranged on one of the faces of the moulding tape, wherein one of the silicone papers is provided with a longitudinal cut which arrangement coincides with that of the first pre-cut of the moulding tape, while the other silicone paper is provided with a longitudinal cut which arrangement coincides with that of the second longitudinal pre-cut of the moulding tape.

7. The vehicle plastering moulding tape according to claim 1, wherein at least one longitudinal section is curved describing a constant radius of curvature.

8. The vehicle plastering moulding tape according to claim 1, therein the longitudinal sections have a thickness of between 0.2 and 0.4 millimeters.

9. The vehicle plastering moulding tape according to claim 1, wherein the plastering moulding tape comprises:

at least two longitudinal sections arranged parallel and adjacent to one another; and at least one adhesive strip, arranged between two adjacent longitudinal sections, such that it connects the longitudinal sections to one another, the adhesive strip further defining an axis of rotation of the longitudinal sections.

10. A method for plastering a surface of a vehicle provided with at least one corner with a vehicle plastering moulding tape according to claim 1, comprising the following steps:

filling the faces of the corner with putty to repair the existing defects in same;

placing the vehicle plastering moulding tape on the putty before it dries, pressing at least one longitudinal section of the plastering moulding tape against one of the faces of the corner, so that the putty adopts the same shape as the longitudinal section;

reworking the putty that protrudes from the vehicle plastering moulding tape and allowing it to stick to the longitudinal section;

once the putty is dry, removing the vehicle plastering moulding tape, pulling the longitudinal section; and sanding the faces of the corner.

11. The method for plastering vehicles according to claim 10, wherein the corner is a straight corner and the vehicle plastering moulding tape is provided with, at least, a longitudinal pre-cut that divides the tape into at least two straight longitudinal sections, and wherein each of the longitudinal sections of the plastering moulding tape is folded around the pre-cut to be placed on one of the faces of the corner.

12. The method for plastering vehicles according to claim 10, wherein the corner is a curved corner and the vehicle plastering moulding tape is provided with, at least, one curved longitudinal section, which radius of curvature coincides with that of the corner, and wherein the longitudinal section is placed on the lower face of the corner.

* * * * *